United States Patent Office 2,749,360
Patented June 5, 1956

2,749,360

ESTERS OF α-2,4,5-TRICHLOROPHENOXY-PROPIONIC ACID

Bill M. Williams, Midland, Mich., assignor to The Dow Chemical Company, Midland, Mich., a corporation of Delaware No Drawing. Application June 2, 1952,
Serial No. 291,329

10 Claims. (Cl. 260—473)

The present invention relates to esters of α-2, 4, 5-trichlorophenoxypropionic acid and is particularly concerned with compounds having the formula

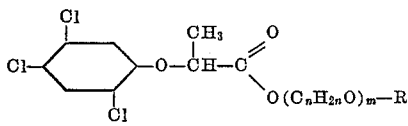

wherein $n$ is an integer from 2 to 3 inclusive, $m$ is an integer from 1 to 3, inclusive, and R represents an alkyl radical containing from 1 to 4 carbon atoms, inclusive. These compounds are adapted to be employed as modifiers in plastic compositions, preservatives for cellulosic materials, and plant growth regulators. The new esters are oily liquids, soluble in many organic solvents and substantially insoluble in water. These compounds are stable to light and air, non-corrosive to the skin of man and higher animals and of low volatility.

The expression "plant growth regulators" as herein employed refers to compounds and compositions which cause effects on vegetation such as the prevention of sprouting of potatoes in storage, the induction of rooting of cuttings, and the prevention of premature abscission of pome fruits as well as the prevention of growth and/or killing of undesirable plant species.

The compounds of the invention may be prepared by reacting one molecular proportion of α-2, 4, 5-trichlorophenoxypropionic acid with one molecular proportion of a glycol or polyglycol monoether of the formula

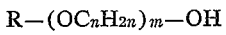

wherein $n$, $m$ and R have the significance set forth above. The reaction is carried out in the presence of an esterification catalyst such as sulfuric acid or an aryl sulfonic acid. Good yields are obtained when the reaction is carried out in an inert solvent and water of reaction is removed as formed.

In a preferred method of operation, the glycol or polyglycol alkyl monoether, a small molecular excess of the α-2, 4, 5-trichlorophenoxypropionic acid, the solvent and the catalyst are mixed together and heated for a period of time at a temperature of from 80° to 125° C. The reaction conveniently may be carried out at the reflux temperature of the solvent, and water of reaction distilled out of the reaction zone, as formed. When the reaction has approached completion, heating is discontinued and the reaction product washed free from catalyst and excess acid with aqueous sodium carbonate solution and water. The solvent and traces of water are then removed by distillation under reduced pressure to obtain the desired ester product as a residue.

Preferred solvents used as media for the present reaction are substantially immiscible with water and boil in the range of 80° to 150° C. Among those found to be convenient in such reactions are benzene, toluene, xylene and ethylene dichloride. Alternatively, it is sometimes convenient to employ an excess of the ether alcohol reactant as a reaction solvent, the excess ether alcohol together with water of reaction being distilled out of the reaction zone under vacuum during the period of reaction.

The glycol and polyglycol alkyl monoethers employed as starting materials may be obtained by the reaction of ethylene oxide and/or propylene oxide with the appropriate molecular proportion of a monohydric aliphatic alcohol. The reaction is carried out in the presence of a catalyst such as sulfuric acid or sodium hydroxide. In one method of preparing the ether alcohols, the reactants are mixed and heated together in the presence of the catalyst for a period of about one-half hour at a temperature of 170° C. and under autogenous pressure. The mixed reaction product may be employed as such or the individual ether alcohols separated by subjecting the mixed reaction product to fractional distillation under reduced pressure.

The following examples illustrate the invention but are not to be construed as limiting the same:

*Example 1.—Butoxypropoxypropyl ester α-2, 4, 5-trichlorophenoxypropionic acid*

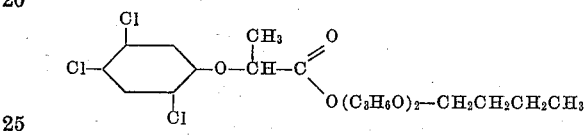

47.57 grams (0.25 mole) of butoxypropoxypropanol, 74.12 grams (0.275 mole) of α-2, 4, 5-trichlorophenoxypropionic acid, 150 milliliters of ethylene dichloride and 1 milliliter of concentrated sulfuric acid were mixed together and heated at a temperature of about 95° C. for 7 hours. Ethylene dichloride and water of reaction distilled out of the reaction zone and were condensed and separated, the ethylene dichloride being returned to the reaction vessel. Upon completion of the reaction, the product was filtered and washed twice with 100 milliliter portions of aqueous 10 percent sodium carbonate solution and once with 100 milliliters of water. The washed product was then heated at a temperature of about 90° C. under a pressure of 20 to 25 millimeters and a current of air drawn through the product for a period of 3.25 hours to recover the ethylene dichloride solvent and remove traces of water. The undistilled residue was filtered to obtain the butoxypropoxypropyl ester of α-2, 4, 5-trichlorophenoxypropionic acid as a light yellow oil having an index of refraction ($n$/D) of 1.4987 at 25° C., a specific gravity (25°/25°) of 1.1910, a chlorine content by analysis of 24.3 percent by weight and a saponification number of 126. The theoretical chlorine content and saponification number for the butoxypropoxypropyl ester of α-2,4,5-trichlorophenoxypropionic acid are 24.1 and 127, respectively.

*Example 2.—1-butoxy-2-propyl ester of α-2,4,5-trichlorophenoxypropionic acid*

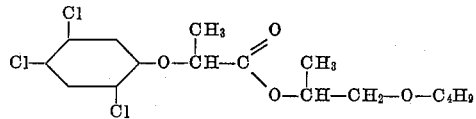

33.05 grams (0.25 mole) of 1-butoxy-2-propanol, 74.12 grams (0.275 mole) of α-2,4,5-trichlorophenoxypropionic acid, 100 milliliters of ethylene dichloride and 1 milliliter of concentrated sulfuric acid were mixed together and heated at temperatures of from 84° to 105° C. for a period of 6 hours. Ethylene dichloride and water of reaction distilled out of the reaction zone and were separated, the ethylene dichloride being returned to the reaction vessel. Upon completion of the reaction, 50 milliliters additional ethylene dichloride was added and the product was washed with successive portions of aqueous 10 percent sodium carbonate solution and water as in Example 1. The washed product was heated to about 90° C. under a pressure of 20 to 25 millimeters and a current of air drawn through the product to remove the ethylene dichloride solvent and traces of water and to obtain as a residue the 1-butoxy-2-propyl ester of α-2,4,5-trichlorophenoxypropionic acid. This product had a refractive index ($n$/D) of 1.5071 at 25° C., a specific gravity (25°/25°) of 1.2231, and a chlorine content by analysis of 27.9 percent by weight as compared to theoretical of 27.8 percent.

*Example 3.—2-ethoxyethyl ester of α-2,4,5-trichlorophenoxypropionic acid*

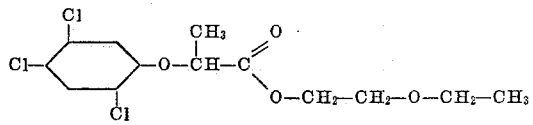

22.53 grams (0.25 mole) of 2-ethoxyethanol, 74.12 grams (0.275 mole) of α-2,4,5-trichlorophenoxypropionic acid, 150 milliliters of ethylene dichloride and 1 milliliter of concentrated sulfuric acid were mixed together and heated to a temperature of from 87.5° to 92.5° C. for a period of 6 hours. Water of reaction was removed and ethylene dichloride recycled, as in Example 1. Upon completion of the reaction, the product was washed with aqueous 10 percent sodium carbonate solution and water and the solvent recovered by vacuum distillation as in the preceding examples to obtain as a residue the 2-ethoxyethyl ester of α-2,4,5-trichlorophenoxypropionic acid. This product had a refractive index ($n$/D) of 1.5232 at 25° C., a specific gravity (25°/25°) of 1.3158, a chlorine content by analysis of 31.3 percent by weight, and a saponification number of 165. The theoretical chlorine content and saponification number for the 2-ethoxyethyl ester of α-2,4,5-trichlorophenoxypropionic acid are 31.2 and 164, respectively.

*Example 4.—2-(2-methoxyethoxy)ethyl ester of α-2,4,5-trichlorophenoxypropionic acid*

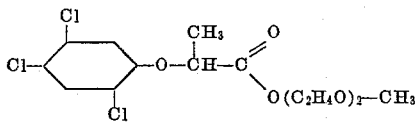

30.04 grams (0.25 mole) of 2-(2-methoxyethoxy)-ethanol, 74.12 grams (0.275 mole) of α-2,4,5-trichlorophenoxypropionic acid, 150 milliliters of ethylene dichloride and 1 milliliter of concentrated sulfuric acid were mixed together and heated at a temperature of 90° to 93.5° C. for a period of 6 hours. The reaction procedure and subsequent purification of the product were carried out as in Example 1 to obtain as a residue the 2-(2-methoxyethoxy)ethyl ester of α-2,4,5-trichlorophenoxypropionic acid. This product had a refractive index ($n$/D) of 1.5240 at 25° C., a chlorine content by analysis of 29.4 percent by weight and a saponification number of 154. The theoretical chlorine content and saponification number for 2-(2-methoxyethoxy)ethyl ester of α-2,4,5-trichlorophenoxypropionic acid are 28.7 and 151, respectively.

*Example 5.—Polypropylene glycol butyl ether ester of α-2,4,5-trichlorophenoxypropionic acid*

1530 grams (10 moles) of a mixed polypropylene glycol butyl ether (having an average molecular weight of 153 and containing 72 percent of 1-butoxy-2-propanol, 20 percent of butoxy-propoxy-propanol and 8 percent of the butyl ethers of tri- and higher polypropylene glycols), 2695.2 grams (10 moles) of α-2,4,5-trichlorophenoxypropionic acid, 1000 milliliters of ethylene dichloride and 10 milliliters of concentrated sulfuric acid were mixed together and heated at temperatures of 106° to 117° C. for a period of 17 hours. Water of reaction was removed and ethylene dichloride recycled as in the previous examples. Upon completion of the reaction, the technical polypropylene glycol butyl ether ester of α-2,4,5-trichlorophenoxypropionic acid was separated by conventional methods as a brown oil having a refractive index ($n$/D) of 1.5050 at 25° C., a specific gravity (25°/25°) of 1.2130, a saponification number of 141.1 and a chlorine content by analysis of 27.0 percent by weight. This product consisted essentially of the butoxy-propyl, butoxy-propoxy-propyl, and butoxy-propoxy-propoxy-propyl esters of α-2,4,5-trichlorophenoxypropionic acid.

The compounds of the invention, dissolved in kerosene or fuel oil at a concentration of 5 pounds of the active compound per 10 gallons of the carrier, are sprayed so as to wet thoroughly the stumps and stubs left after cutting over areas of land covered with woody brush. Substantially 100 percent control of regrowth from the stumps and stubs is obtained.

I claim:

1. The esters of α-2,4,5-trichlorophenoxypropionic acid having the formula

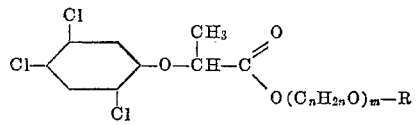

wherein $n$ is an integer from 2 to 3, inclusive, $m$ is an integer from 1 to 3, inclusive, and R represents an alkyl radical containing from 1 to 4 carbon atoms, inclusive.

2. The esters of α-2,4,5-trichlorophenoxypropionic acid having the formula

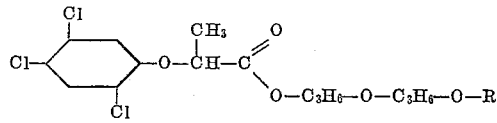

wherein R represents an alkyl radical containing from 1 to 4 carbon atoms, inclusive.

3. The esters of α-2,4,5-trichlorophenoxypropionic acid having the formula

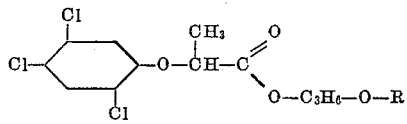

wherein R represents an alkyl radical containing from 1 to 4 carbon atoms, inclusive.

4. The butoxy-propoxy-propyl ester of α-2,4,5-trichlorophenoxypropionic acid.

5. The butoxy-propyl ester of α-2,4,5-trichlorophenoxypropionic acid.

6. The esters of α-2,4,5-trichlorophenoxypropionic acid having the formula

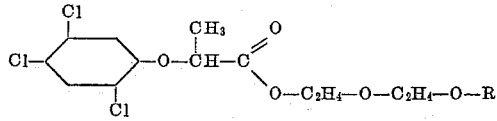

wherein R represents an alkyl radical containing from 1 to 4 carbon atoms, inclusive.

7. The esters of α-2,4,5-trichlorophenoxypropionic acid having the formula

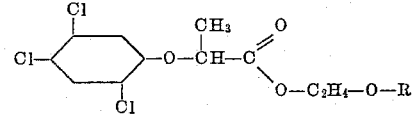

wherein R represents an alkyl radical containing from 1 to 4 carbon atoms, inclusive.

8. The methoxy-ethoxy-ethyl ester of α-2,4,5-trichlorophenoxypropionic acid.

9. The ethoxy-ethyl ester of α-2,4,5-trichlorophenoxypropionic acid.

10. The 1-butoxy-2-propyl ester of α-(2,4,5-trichlorophenoxy)propionic acid.

References Cited in the file of this patent

UNITED STATES PATENTS

| | | |
|---|---|---|
| 2,543,397 | Allen | Feb. 27, 1951 |
| 2,562,855 | Britton et al. | July 31, 1951 |
| 2,596,089 | Allen | May 13, 1952 |

OTHER REFERENCES

Fults et al.: Jour. Amer. Soc. Agronomy; 673–674 (1947).